United States Patent [19]
Sunvold et al.

[11] Patent Number: 6,039,952
[45] Date of Patent: Mar. 21, 2000

[54] COMPOSITION AND METHOD FOR IMPROVING CLINICAL SIGNS IN ANIMALS WITH RENAL DISEASE

[75] Inventors: Gregory D. Sunvold, Eaton; Mark A. Tetrick; Gregory A. Reinhart, both of Dayton, all of Ohio

[73] Assignee: The Iams Company, Dayton, Ohio

[21] Appl. No.: 09/176,440

[22] Filed: Oct. 21, 1998

Related U.S. Application Data

[60] Provisional application No. 60/063,490, Oct. 22, 1997.

[51] Int. Cl.⁷ ..................................... A61K 35/78
[52] U.S. Cl. ............................... 424/195.1; 514/2; 426/2; 426/656
[58] Field of Search ........................ 426/656, 2; 314/2; 424/195.1

[56] References Cited

U.S. PATENT DOCUMENTS

| | | |
|---|---|---|
| 4,044,158 | 8/1977 | Burkwall, Jr. . |
| 4,267,195 | 5/1981 | Boudreau et al. ................. 426/2 |
| 4,282,254 | 8/1981 | Franzen et al. ................... 426/2 |
| 4,918,057 | 4/1990 | Kilpartick .......................... 514/30 |
| 5,017,389 | 5/1991 | Green . |
| 5,312,638 | 5/1994 | Traitler et al. . |
| 5,397,803 | 3/1995 | Smith et al. . |
| 5,545,414 | 8/1996 | Behr et al. ....................... 424/484 |
| 5,616,569 | 4/1997 | Reinhart . |
| 5,684,045 | 11/1997 | Smith et al. . |
| 5,776,524 | 7/1998 | Reinhart . |

FOREIGN PATENT DOCUMENTS

| | | |
|---|---|---|
| 0 674 842 A1 | 1/1995 | European Pat. Off. . |
| 1293378 | 10/1972 | United Kingdom . |
| WO 9603150A1 | 2/1996 | WIPO . |
| WO 97/13415 | 4/1997 | WIPO . |

OTHER PUBLICATIONS

Muir, H.E. et al., J. Anim. Sci., vol. 74(7), p. 1641–1648. 1996.
Han, I.K. et al., AJAS, vol. 8(4), p. 393–402. 1995.
Huber, T.L. et al., JAVMA, vol. 199(6), p. 731–734, Sep. 1991.
Smith, F.H. et al., Irish Vet. J., vol. 22(2) (New Series), p. 22–27, Feb. 1968.
Hintz, H.F., J. Nutr., vol. 124(12) (Suppl.), pp. 2723S–2729S, 1994.
Flodin, N.W., J. of the American College of Nutr., vol. 12(5), p. 486–500, 1993.
Friesen, K.G. et al., J. Anim. Sci., vol. 71(8), p. 2089–2098, 1993.
Bhattachrya, M. et al., J. of Food Sci., vol. 51(4), p. 988–993, 1986.
M.D. Howard et al, Effect of fermentable fiber consumption by the dog on nitrogen balance and fecal Microbial nitrogen excretion, FASEB Journal, vol. 10, 1996, pg. A257, XP002072350.
G.D. Sunvold et al., "Dietary fiber for dogs: IV. In vitro fermentation of selected fiber sources . . . Supplemented diets", Journal Of Animal Science, vol. 73, 1995, pp. 1099–1109, XP002072351.
M. Dietz et al., "Influence of a blend of fructo–oligosaccharides and sugar beet fiber on nutrient digestibility and plasma metabolite concentrations in healhty Beagles" American Journal Of Veterinary Research, vol. 58, No. 11, 1997, pp. 1238–1242, XP–002072352.
H. Younes et al., "Fermentable Fibers or Oligosaccharides Reduce Urinary Nitrogen Excretion by Increasing Urea Disposal in the Rat Cecum", *Am. Instr. Nutrition*, pp. 1010–1016, 1995.
Kerley et al., "Physiological Response to Short Chain Fatty Acid Production in the Intestine", *Proceedings of the 1996 Iams International Nutrition Symposium*, pp. 33–39, c. 1996.
Williard M D et al., Effects of Dietary Supplementation of Fructo–Olgossacharides On Small Intestinal Bacterial Overgrowth in Dogs:, Amer. Journ. Of Veter. Research, vol. 55, May 1994, pp. 654–659.
The Hill's Key to Clinical Nutrition, "Prescription Diet Canine k/d" Jan., 1998.

*Primary Examiner*—Jean C. Witz
*Attorney, Agent, or Firm*—Killworth, Gottman, Hagan & Schaeff, L.L.P.

[57] ABSTRACT

A pet food composition is provided which improves several important clinical indicators in an animal suffering from renal disease and includes adequate protein, has low phosphorus levels, improves metabolic buffering, and lowers blood triglyceride levels in the animal. The animal is fed a composition which includes from about 10 to about 32% crude protein, from about 8 to about 20% fat, from about 3 to about 25% total dietary fiber, and fermentable fibers which have an organic matter disappearance of 15 to 60 percent when fermented by fecal bacteria for a 24 hour period, the fibers being present in amounts from about 1 to 11 weight percent of supplemental total dietary fiber.

14 Claims, No Drawings

COMPOSITION AND METHOD FOR IMPROVING CLINICAL SIGNS IN ANIMALS WITH RENAL DISEASE

CROSS REFERENCE TO RELATED APPLICATIONS

This application claims the benefit of U.S. provisional application Ser. No. 60/063,490 filed Oct. 22, 1997.

BACKGROUND OF THE INVENTION

This invention relates to a pet food product and process for its use in improving clinical signs in animals suffering from renal disease.

Renal failure is one of the most common causes of death in dogs. In animals which suffer from renal disease, several blood indices are used to determine the severity of the disease. These indices include blood urea nitrogen (BUN) and creatinine. BUN and creatinine levels in the bloodstream increase during the course of renal failure because damage to the kidney of the animal makes the kidney inadequate to filter waste products. Because inadequate filtration of waste products is the fundamental basis of renal disease, BUN and creatinine are considered the primary indicators of renal disease.

Other clinical parameters which are important to the animal suffering from renal disease are phosphorus, carbon dioxide, and triglyceride levels. Hyperphosphatemia (abnormally high blood levels of phosphorus) often manifests itself during renal disease. Previous scientific research has indicated that lowering dietary intake of phosphorus is beneficial to lessening the progression of renal disease. However, prior commercial pet food formulations have been unable to provide low levels of dietary phosphorus and still meet all of the amino acid requirements of the canine because the phosphorus component of such diets is primarily derived from ingredients high in protein. Thus, lowering the phosphorus content of the diet required a lowering of the protein components in the diet to levels which are insufficient to supply the amino acid requirements of the animal.

Carbon dioxide levels are an indicator of the level of metabolic buffering (acid-base balance) that occurs in an animal. Metabolic acidosis becomes a problem for an animal suffering from renal disease, and high carbon dioxide levels are indicators of a lack of buffering. Another parameter which is important in animals suffering from renal disease is the blood triglyceride level. It is important in the animal suffering from renal disease as the triglyceride level is often greater than in normal animals. It would be desirable to be able to control these additional parameters in the renal patient through diet.

Current dietary therapies to reduce measured BUN, creatinine, and phosphorus levels include decreasing the amount of dietary protein to levels where amino acids are present in insufficient quantities. Decreasing the level of dietary protein decreases BUN since urea is ultimately derived from protein. However, such diets may result in other problems developing for the animal as the animal's protein needs are unmet. Accordingly, there remains a need in this art for a pet food dietary composition which will result in the lowering of BUN, creatinine, and phosphorus levels in the animal without lowering dietary protein to insufficient levels. There also remains a need in this art for a pet food dietary composition which provides improved metabolic buffering and which lowers triglyceride levels in the renal patient.

SUMMARY OF THE INVENTION

The present invention meets those needs by providing a pet food composition which improves several important clinical indicators in the renal patient and includes adequate protein, has low phosphorus levels, improves metabolic buffering, and lowers blood triglyceride levels in the animal. In accordance with one aspect of the invention, a process for improving clinical signs in an animal with renal disease is provided and includes the steps of feeding the animal a composition comprising from about 10 to about 32 wt % crude protein, from about 8 to about 20 wt % fat, from about 3 to about 25 wt % total dietary fiber, and fermentable fibers which have an organic matter disappearance of 15 to 60 percent when fermented by fecal bacteria for a 24 hour period, the fibers being present in amounts from about 1 to 11 weight percent of supplemental total dietary fiber. The animal is maintained on the diet for a sufficient period of time to reduce BUN and creatinine levels in the animal. Preferably, the composition contains from about 15 to about 25% crude protein, and most preferably, from about 17 to about 22% crude protein. Preferably the composition contains from about 10 to about 16% fat, and most preferably from about 13 to about 15% fat. Preferably the composition contains from about 5 to about 15% total dietary fiber, and most preferably from about 7 to about 12% total dietary fiber.

In a preferred embodiment of the invention, the composition contains from 2 to 9 weight percent of supplemental total dietary fiber of the fermentable fibers, more preferably from 3 to 7 weight percent, and most preferably from 4 to 7 weight percent of supplemental total dietary fiber of the fermentable fibers. It is preferred that the fermentable fibers have an organic matter disappearance of 20 to 50 percent, and more preferably 30 to 40 percent.

The fermentable fibers are selected from the group consisting of beet pulp, gum arabic, gum talha, psyllium, rice bran, carob bean gum, citrus pulp, pectin, fructooligosaccharides, mannanoligosaccharides and mixtures thereof. In a preferred embodiment, the fermentable fibers are selected from the group consisting of beet pulp, gum arabic, gum talha, citrus pulp, and fructooligosaccharides. Most preferably, the fermentable fibers are beet pulp or a blend of beet pulp, gum talha or gum arabic, and fructooligosaccharides.

Optionally, the composition may also have a phosphorus content of less than about 0.50%, and preferably less than about 0.25%, by weight to prevent hyperphosphatemia. The composition may also optionally contain potassium citrate as a metabolic buffering agent. Inclusion of potassium citrate has been found to ameliorate metabolic acidosis in animals with renal disease.

In another embodiment of the invention, a low-phosphorus pet food composition is provided and comprises from about 10 to about 32% crude protein, from about 8 to about 20% fat, and from about 3 to about 25% total dietary fiber, with the percentage of phosphorus being less than about 0.50%, and preferably less than about 0.25%, all percentages by weight. Preferably, the composition contains from about 15 to about 25% crude protein, and most preferably, from about 17 to about 22% crude protein. Preferably the composition contains from about 10 to about 16% fat, and most preferably from about 13 to about 15% fat. Preferably the composition contains from about 5 to about 15% total dietary fiber, and most preferably from about 7 to about 12% total dietary fiber. In order to maintain this low phosphorus content while still providing an adequate amount of amino acids, a combination of low phosphorus-containing protein sources are utilized. Preferred low phosphorus sources of protein for the composition include soy protein isolate and corn gluten meal.

Optionally, the composition further includes L-lysine and L-tryptophan as amino acid supplements.

Preferred percentages (by weight) of the protein and amino acid components of the composition are: from about 5 to about 15% soy protein isolate, from about 0.5 to about 2.5% corn gluten meal, from about 0.01 to about 0.22% L-lysine, and from about 0.01 to about 0.22% L-tryptophan. A preferred weight ratio of soy protein isolate to corn gluten meal to L-tryptophan to L-lysine is 420:46.5:5:1.

In yet another embodiment of the invention, a process for lowering blood serum triglycerides in an animal with renal disease is provided and includes the steps of feeding the animal a diet comprising from about 10 to about 32% by weight crude protein, from about 8 to about 20% by weight fat, and fermentable fibers which have an organic matter disappearance of 15 to 60 percent when fermented by fecal bacteria for a 24 hour period, the fibers being present in amounts from about 1 to 11 weight percent of supplemental total dietary fiber, and in which the ratio of calories from protein in the diet to calories from fat in the diet is greater than about 0.40:1. Preferably, the composition contains from about 15 to about 25% crude protein, and most preferably, from about 17 to about 22% crude protein. Preferably the composition contains from about 10 to about 16% fat, and most preferably from about 13 to about 15% fat. Preferably the composition contains from about 5 to about 15% total dietary fiber, and most preferably from about 7 to about 12% total dietary fiber. Such a diet provides a much higher ratio of protein to fat calories than previous diets. Optionally, the diet may also include sources of omega-6 and omega-3 fatty acids in a ratio of from about 1:1 to about 10:1 of omega-6 fatty acids to omega-3 fatty acids which also act to lower serum triglyceride levels.

Accordingly, it is a feature of the present invention to provide a pet food composition and process which improves several important clinical indicators in the renal patient and includes adequate protein, has low phosphorus levels, improves metabolic buffering, and lowers blood triglyceride levels in the animal. This, and other features and advantages of the present invention, will become apparent from the following detailed description and the appended claims.

DETAILED DESCRIPTION OF THE PREFERRED EMBODIMENTS

The present invention utilizes a pet food composition which, when fed to a companion animal such as a dog or cat, results in an improvement in several clinical signs associated with renal disease. In one embodiment of the invention, the composition contains fermentable fibers which aid in the removal of nitrogenous wastes, including urea, from the animal. As described in Reinhart et al, commonly-assigned, copending U.S. patent application Ser. No. 08/827,405, filed Mar. 27, 1997, the disclosure of which is hereby incorporated by reference, inclusion of such fermentable fibers in a pet food composition acts to remove nitrogen from the blood, to enhance blood flow to colonic tissues, and to enhance metabolic fuel availability to intestinal cells. These fermentable fibers are a preferred nutritional source for bacteria in the colon, providing an increase in the quantity of bacteria in the colon. Such colonic bacteria also require nitrogen to reproduce. That nitrogen is derived from urea drawn into the intestinal lumen from the portal blood. Once it is inside the intestinal lumen, the nitrogen from urea and carbon skeletons from the fibers are synthesized into bacterial protein and consequently excreted in the feces.

Increased colonic blood flow promotes a healthy gut by keeping the colonic tissues infused with nutrients. While not wishing to be bound by any particular theory, the mechanism by which this blood flow increase occurs is believed to be either:

1) short chain fatty acids causing a relaxation of the resistance arteries of the colon; or, 2) short chain fatty acid absorption increasing intestinal metabolic activity, which elicits increased blood flow.

The fermentable fibers display certain organic matter disappearance percentages. The fermentable fibers used in the present invention have an organic matter disappearance (OMD) of from about 15 to 60 percent when fermented by fecal bacteria in vitro for a 24 hour period. That is, from about 15 to 60 percent of the total organic matter originally present is fermented and converted by the fecal bacteria. The organic matter disappearance of the fibers is preferably 20 to 50 percent, and most preferably is 30 to 40 percent.

Thus, in vitro OMD percentage may be calculated as follows:

$$\{1-[(OM\ \text{residue}-OM\ \text{blank})/OM\ \text{initial}]\}\times 100,$$

where OM residue is the organic matter recovered after 24 hours of fermentation, OM blank is the organic matter recovered in corresponding blank tubes (i.e., tubes containing medium and diluted feces, but no substrate), and OM initial is that organic matter placed into the tube prior to fermentation. Additional details of the procedure are found in Sunvold et al, J. Anim. Sci. 1995, vol. 73: 1099–1109.

Fermentable fibers which are useful in the present invention produce short chain fatty acids (SCFAs) within a range of from about 28 to about 85 mmol SCFA per 1000 Calories (kcals) of metabolizable energy (ME), and more preferably within a range of from about 42 to about 71 mmol SCFA per 1000 ME kcals. This equates to a composition which has a total fermentable fiber content which yields from about 100 to about 350 mmol SCFA/kg of diet.

Millimoles of SCFAs per 1000 metabolizable energy kilocalories are calculated by first calculating the total Calories of metabolizable energy (ME) in a given diet composition per kilogram of the composition. The number of grams per 1000 kcal ME may be derived from the first calculation. Then the grams, and thus millimoles, of the fermentable fiber components of the composition may be calculated.

The fermentable fibers may be any fiber source which intestinal bacteria present in the animal can ferment to produce significant quantities of SCFAs. "Significant quantities" of SCFAs, for purposes of this invention, are amounts over 0.5 mmol of total SCFAs/gram of substrate in a 24 hour period. Preferred fibers include beet pulp, gum arabic (including gum talha), psyllium, rice bran, carob bean gum, citrus pulp, pectin, fructooligosaccharides, mannanoligosaccharides and mixtures of these fibers.

The fermentable fibers are used in the pet food composition in amounts from 1 to 11 weight percent of supplemental total dietary fiber, preferably from 2 to 9 weight percent, more preferably from 3 to 7 weight percent, and most preferably from 4 to 7 weight percent.

A definition of "supplemental total dietary fiber" first requires an explanation of "total dietary fiber". "Total dietary fiber" is defined as the residue of plant food which is resistant to hydrolysis by animal digestive enzymes. The main components of total dietary fiber are cellulose, hemicellulose, pectin, lignin and gums (as opposed to "crude fiber", which only contains some forms of cellulose and lignin). "Supplemental total dietary fiber" is that dietary fiber which is added to a food product above and beyond any dietary fiber naturally present in other components of the food product. Also, a "fiber source" is considered such when it consists predominantly of fiber.

Other clinical indicators which are important to the renal patient are levels of phosphorus, carbon dioxide, and triglycerides in the blood. Abnormally high levels of phosphorus often manifests itself during renal disease. The present invention provides a low-phosphorus content pet food composition containing from about 10 to about 32% crude protein, from about 8 to about 20% fat, and from about 3 to about 25% total dietary fiber, with the percentage of phosphorus being less than about 0.50% and preferably less than 0.25%, all percentages by weight. Preferably, the composition contains from about 15 to about 25% crude protein, and most preferably, from about 17 to about 22% crude protein. Preferably the composition contains from about 10 to about 16% fat, and most preferably from about 13 to about 15% fat. Preferably the composition contains from about 5 to about 15% total dietary fiber, and most preferably from about 7 to about 12% total dietary fiber. Low phosphorus levels slow the progression of renal disease and manage hyperphosphatemia through diet. In order to maintain this low phosphorus content while still providing an adequate amount of amino acids in the diet, a combination of low phosphorus containing protein sources are utilized. Preferred low phosphorus sources of protein for the composition include soy protein isolate and corn gluten meal. Moderate amounts of these high quality protein sources help to maintain glomerular filtration rate, lean muscle mass, and other bodily functions. Optionally, the composition further includes L-lysine and L-tryptophan, amino acids which are necessary to an animal's good health.

Preferred percentages (by weight) of the protein and amino acid components of the composition are: from about 5 to about 15% soy protein isolate, from about 0.5 to about 2.5% corn gluten meal, from about 0.01 to about 0.22% L-lysine, and from about 0.01 to about 0.22% L-tryptophan. A preferred weight ratio of soy protein isolate to corn gluten meal to L-tryptophan to L-lysine is 420:46.5:5:1.

Carbon dioxide levels in an animal's blood gases are also indicators of disturbances in an animal's acid-base balance. Metabolic acidosis, a condition where too much acid is present in the blood, often manifests itself in an animal with renal disease. Such a condition may be managed by adding potassium citrate to the diet of the animal to improve metabolic buffering.

Another embodiment of the invention provides a process for lowering blood serum triglycerides in an animal with renal disease. Lowering the level of blood triglycerides in an animal with renal disease is important as high triglyceride levels are often manifested with the disease. By altering the levels of fats and fatty acids in the animal's diet, triglycerides may be lowered.

The animal is fed a diet comprising from about 10 to about 32% crude protein, from about 8 to about 20% fat, all percentages by weight. Preferably, the diet contains from about 15 to about 25% crude protein, and most preferably, from about 17 to about 22% crude protein. Preferably the diet contains from about 10 to about 16% fat, and most preferably from about 13 to about 15% fat. Preferably the diet contains from about 5 to about 15% total dietary fiber, and most preferably from about 7 to about 12% total dietary fiber. The diet also includes fermentable fibers which have an organic matter disappearance of 15 to 60 percent when fermented by fecal bacteria for a 24 hour period, the fibers being present in amounts from about 1 to 11 weight percent of supplemental total dietary fiber. Because the fermentable fibers act to lower BUN and repartition nitrogenous wastes from the urine to the feces of the animal, excessive levels of dietary fat are not needed to dilute calories provided by protein in the diet. Thus, the ratio of calories from protein in the diet to calories from fat in the diet is preferably greater than about 0.40:1. Such a diet provides a much higher ratio of protein to fat calories than previous diets while lowering triglyceride levels.

The diet may also include sources of omega-6 and omega-3 fatty acids in a ratio of from about 1:1 to about 10:1 of omega-6 fatty acids to omega-3 fatty acids. Such a combination of these fatty acids increase the activity of lipoprotein lipase (LPL) in the animal. Increased LPL activity increases fatty acid oxidation and thus decreases blood triglyceride levels. The omega-6:omega-3 fatty acid ratio also results in lower intra renal blood pressure and reduces inflammatory mediators.

In order that the invention may be more readily understood, reference is made to the following examples, which are intended to be illustrative of the invention, but are not intended to be limiting in scope.

EXAMPLE 1

An experiment was conducted to determine the effects on certain clinical signs in dogs with renal disease. Table 1 below summarizes the percentage of calories derived from each macronutrient in a conventional pet food diet versus the diet of the present invention. Table 2 summarizes the results obtained from four adult dogs suffering from renal disease and compare their clinical BUN, creatinine, phosphorus, carbon dioxide, and triglycerides levels before and after consuming the diet of the present invention.

TABLE 1

Percentage of Calories From Each Macronutrient in Conventional Diets versus Diet of the Present Invention for Dogs With Renal Disease:

| Diet | Protein | Fat | Carbohydrate |
| --- | --- | --- | --- |
| Conventional | 10.6 | 38.7 | 50.8 |
| Formulation of the present invention | 12.9–17.3 | 29.4–31.1 | 57.7–51.6 |

As can be seen, the diet of the present invention provides a much greater percentage of calories from protein and less from fat than prior diets.

TABLE 2

Summary of Results From Four Dogs Before and After Consuming Diet of the Present Invention:

| | BUN | Creatinine | Phosphorus | $CO_2$ | Triglycerides |
| --- | --- | --- | --- | --- | --- |
| Before[a] | 60.3 | 3.4 | 59 | 19.0 | 240.0 |
| After | 51.8 | 2.8 | 5.3 | 21.8 | 99.8 |
| Normal Range | 6–32 | 0.4–1.1 | 2.7–5.8 | 14–30 | 31–105 |

[a]Prior to consuming the diet of the present invention, dogs were fed a standard commercial diet used with renal patients.

EXAMPLE 2

Clinical cases of canine renal failure were recruited from local veterinary clinics near Dayton, Ohio for a study. Most of the dogs were fed a commercially prepared diet restricted in protein and phosphorus for at least two weeks prior to gathering baseline information and laboratory analysis. Patients identified as "Zak" and "Squirt" were fed other commercial maintenance diets.

Baseline laboratory analysis of the dogs included: blood chemistry panel, plasma ammonia, parathyroid hormone (intact) (PTH), hematology and urinalysis. Dogs were switched over a several day period to Renal Diet 1 or Renal Diet 2 (both examples of compositions of the present invention) according to the following guidelines: If BUN was 30–65 mg/dL and creatinine was between 1.5–2.5 mg/dL, dogs were transitioned to Renal Diet 1. Dogs with BUN>65 mg/dL and creatinine>2.5 mg/dL were transitioned to Renal Diet 2. Two and 5 week rechecks consisted of a blood chemistry panel and urinalysis. The 10 week recheck included the same sampling and laboratory work as the baseline.

Diet analysis is presented in Table 3 below. The conventional renal diet was a commercially-available low protein, restricted phosphorus canine renal diet (Hill's® Prescription Diet® Canine k/d®).

TABLE 3

Diet Characteristics (dry matter basis)

| | Typical Analysis | Analysis of Diet Fed | |
|---|---|---|---|
| | Conventional Renal Diet | Renal Diet 1 | Renal Diet 2 |
| Crude Protein, % | 14.2 | 21.1 | 17.5 |
| Fat, % | 19.6 | 14.3 | 13.0 |
| Ash, % | 3.3 | 5.8 | 4.2 |
| Crude Fiber, % | 1.1 | 3.0 | 2.7 |
| Calcium, % | 0.78 | 0.95 | 0.65 |
| Phosphorus, % | 0.31 | 0.45 | 0.29 |
| omega-6:3 fatty acid ratio | 22:1 | 4.41 | 5.61 |
| % calories from protein | 10.6 | 17.3 | 12.9 |
| % calories from fat | 38.7 | 31.1 | 29.4 |
| % calories from carbohydrates | 50.8 | 51.6 | 67.7 |

Renal Diets 1 and 2 differ in the following ways from the conventional renal diet. They contain 50% and 25% more protein, respectively. Total fat content is reduced by 30% in both Renal Diets 1 and 2. Renal Diets 1 and 2 have an omega-6:omega-3 fatty acid ratio of approximately 5:1 versus 22:1 for the conventional renal diet. Renal Diets 1 and 2 contain a fermentable fiber blend.

The results of the study are summarized and reported in Table 4 below.

TABLE 4

Canine Renal Patients Transitioned to Renal Diet 1 and Renal Diet 2

| | WEEK | BUN (mg/dL) | Creatinine (mg/dL) | Phosphorus (mg/dL) | Triglycerides (mg/dL) | NH₃ (mg/dL) | PTH (Pg/mL) | Urine Specific Gravity | Urine Protein | Hematocrit (%) | Hemoglobin (g/dL) |
|---|---|---|---|---|---|---|---|---|---|---|---|
| LAB NORMAL RANGE | | 10–30 | 0.5–1.5 | 3–6 | 0–160 | 20–120 | 16–136 | 1.018–1.045 | Neg | 35–56 | 12–18 |
| | | | | | CANINE RENAL PATIENTS TRANSITIONED TO RENAL DIET 1 | | | | | | |
| "Dumas" is an 18-year-old, 20 lb, neutered male mixed breed with a 1 year history of renal failure. He had been fed the conventional renal diet since renal failure was diagnosed. | Initial | 63 | 2.3 | 5.9 | 48 | 39 | 246 | 1.016 | Trace | 36.7 | 12.8 |
| | 2 | 62 | 2.6 | 5.3 | 82 | — | — | 1.012 | Neg | — | — |
| | 5 | 57 | 2.2 | 4.8 | 65 | — | — | 1.014 | Neg | — | — |
| | 10 | 55 | 2.1 | 4.3 | 411 | 62 | 182 | 1.014 | Neg | 35.7 | 12.2 |
| "Bessie" is a 12-year-old, 59 lb, spayed female Bassett Hound with a 1 year history of mild azotemia. She had been fed the conventional renal diet for 8 months prior to the switch to Renal Diet 1. | Initial | 37 | 0.9 | 5.1 | 330 | 161 | 55 | 1.012 | 3+ | 45.7 | 17.5 |
| | 2 | 42 | 1.0 | 5.1 | 275 | — | — | 1.015 | 3+ | — | — |
| | 5 | 36 | 1.2 | 4.2 | 129 | — | — | 1.012 | 3+ | — | — |
| | 10 | 37 | 1.0 | 3.7 | 1.08 | 96 | 496 | 1.012 | 3+ | 46.9 | 15.0 |
| | 23 | 46 | 1.6 | 4.4 | 174 | 31 | 136 | 1.012 | 3+ | 48.9 | 15.9 |
| "Max" is a 9-year-old, 80 lb, neutered male Golden Retriever. The duration of Max's renal failure was not reported. | Initial | 50 | 1.7 | 3.4 | 144 | — | 41 | 1.020 | 3+ | 46.3 | 15.5 |
| | 2 | 41 | 1.8 | 2.7 | 130 | — | — | 1.022 | 3+ | — | — |
| | 5 | 35 | 1.6 | 1.5 | 133 | — | — | 1.021 | 3+ | — | — |
| | 10 | 48 | 1.8 | 4.5 | 115 | — | — | 1.026 | 3+ | 47.7 | 16.6 |
| "Shamrock" is an 8-year-old, 35 lb, spayed female Spaniel mix with a 1 month history of signs of renal failure prior to starting the study. | Initial | 23 | 3.0 | 4.1 | 41 | 132 | 74 | 1.009 | Neg | 43.2 | 14.8 |
| | 2 | 33 | 2.9 | 3.9 | 32 | — | — | 1.013 | Neg | — | — |
| | 5 | 39 | 2.4 | 4.0 | 49 | — | — | 1.013 | Neg | — | — |
| | 10 | 41 | 2.4 | 3.5 | 50 | 34 | 157 | 1.017 | Neg | 39.1 | 12.6 |
| | 23 | 51 | 2.4 | 3.0 | 311 | 69 | — | 1.018 | Neg | 44 | 15.5 |
| "Squirt" is a 14 year-old, 12 lb, spayed female, mixed breed. Squirt had signs of renal failure for about 1 month prior to starting the study. She was fed Eukanuba® Senior Maintenance Formula. | Initial | 31 | 1.6 | 3.2 | 159 | 194 | 128 | 1.017 | Neg | 39.8 | 13.6 |
| | 2 | 25 | 1.5 | 2.7 | 618 | — | — | 1.017 | Neg | — | — |
| | 5 | 29 | 1.6 | 1.9 | 73 | — | — | 1.017 | Neg | — | — |
| | 10 | 32 | 1.7 | 2.3 | 134 | 42 | 114 | 1.015 | Neg | 48.1 | 16 |
| "Zak" is a 10-year-old, 63 lb, intact male Collie mix, Zak's renal failure was diagnosed about 1 week prior to starting the study. Zak was fed Pedigree® prior to starting the study. | Initial | 44 | 2.1 | 4.7 | 112 | — | — | 1.015 | 3+ | 52.6 | 17.7 |
| | 2 | 36 | 1.9 | 4.3 | 18 | — | 119 | 1.028 | 3+ | — | — |
| | 5 | 39 | 2.0 | 4.1 | 88 | — | — | 1.027 | 3+ | — | — |
| | 10 | 43 | 2.0 | 4.1 | 76 | 33 | 113 | 1.018 | 3+ | 54.1 | 17.2 |
| | | | | | LAB NORMAL RANGE | | | | | | |
| | | 10–30 | 0.5–1.5 | 3.0–6.0 | 0–160 | 20–120 | 16–136 | 1.018–1.045 | Neg | 35–56 | 12–18 |
| | | | | | CANINE RENAL PATIENTS TRANSITIONED TO RENAL DIET 2 | | | | | | |
| "Elle" is a 4-year-old, 70 lb, spayed female Labrador Retriever. She had an acute onset of renal failure and was on a standard low protein renal diet for 2 weeks prior to transitioning to Renal Diet 2. | Initial | 79 | 8.8 | 6.0 | 470 | 45 | 237 | 1.012 | 1+ | 36.9 | 13.4 |
| | 2 | 67 | 7.2 | 3.9 | 75 | — | — | 1.011 Trace | — | — | — |
| | 5 | 58 | 6.2 | 4.0 | 131 | — | 230 | 1.013 | 1+ | — | — |
| | 10 | 72 | 6.8 | 5.6 | 31 | 88 | — | 1.011 | Neg | 32.1 | 10.7 |
| "Peaches" is a 12-year-old, spayed female Cocker Spaniel. She had a 2 year history | Initial | 62 | 1.5 | 6.7 | 112 | 145 | 319 | 1.015 | 3+ | 48.1 | 16.4 |
| | 2 | 49 | 1.5 | 7.2 | 101 | — | — | 1.0121 | 3+ | — | — |

TABLE 4-continued

Canine Renal Patients Transitioned to Renal Diet 1 and Renal Diet 2

| WEEK | BUN (mg/dL) | Creatinine (mg/dL) | Phosphorus (mg/dL) | Triglycerides (mg/dL) | NH$_3$ (mg/dL) | PTH (Pg/mL) | Urine Specific Gravity | Urine Protein | Hematocrit (%) | Hemoglobin (g/dL) |
|---|---|---|---|---|---|---|---|---|---|---|
| 5 | 56 | 1.5 | 8.2 | 98 | — | — | 1.011 | 3+ | — | — |
| 10 | 72 | 1.2 | 6.0 | 203 | 189 | 650 | 1.010 | 2+ | 47.3 | 16.8 | of renal insufficiency and had been fed the conventional renal diet since that time.

As shown by the data in Table 4, for those dogs who were transitioned to Renal Diets 1 and 2, BUN and creatinine concentrations were lower or comparable to the initial values over the ten weeks following the transition from the conventional renal diet. Serum phosphorus concentrations declined, except for Max and Peaches. Peaches' serum phosphorus may have been increased by feeding of table scraps. Responses in PTH levels were variable. Serum triglycerides tended to be lower in most cases. Blood ammonia concentrations were reduced in several cases. Dumas had an increase in blood ammonia concentration but it was still well with in the normal range. Peaches had a high blood ammonia initially and it increased slightly on recheck. Diet acceptance was better, relative to the conventional renal diet, in 5 of 6 dogs. Squirt's and Zak's acceptance of Renal Diet 1 was similar to the commercial maintenance diets fed previously.

Overall coat quality, as judged by the owners, was improved in 3 of 3 dogs transitioned to Renal Diet 1. Coat quality for Squirt and Zak was unchanged following transition from their commercial maintenance diets. Similarly, Elle and Peaches were transitioned from the conventional renal diet to Renal Diet 2 and their coat quality was judged to be unchanged following the diet transition. Dumas had a several month history of constipation that resolved with transition to Renal Diet 1.

The data show that increased protein was provided to the dogs by Renal Diets 1 and 2 without exacerbating azotemia. Fermentable fiber and supplementation of limiting amino acids may allow for greater dietary protein intake without increasing BUN. Serum phosphorus concentrations decreased in most cases; longer term follow-up may be required to observe the expected decline in PTH. Lower triglycerides probably resulted from the lower percentage of calories from fat and also from the lower omega 6:3 fatty acid ratio. Blood ammonia was not exacerbated by the enhanced bacterial activity in the colon. Diet acceptance was better relative to the conventional renal diet and similar to commercial maintenance diets for Renal Diet 1. Acceptance of Renal Diet 2 was comparable to that for the conventional renal diet.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A low-phosphorus pet food composition comprising from about 10 to about 32% crude protein, from about 8 to about 20% fat, and from about 3 to about 25% total dietary fiber, and wherein said composition has less than about 0.25% phosphorus, all percentages by weight (dry matter basis).

2. The composition as claimed in claim 1 in which said crude protein is supplied from soy protein isolate and corn gluten meal.

3. The composition as claimed in claim 1 in which said composition further includes L-lysine and L-tryptophan.

4. The composition as claimed in claim 1 in which the protein content of said composition includes from about 5 to about 15% soy protein isolate and from about 0.5 to about 2.5% corn gluten meal, said composition further including from about 0.01 to about 0.22% L-lysine, and from about 0.01 to about 0.22% L-tryptophan.

5. The composition as claimed in claim 4 in which the weight ratio of soy protein isolate to corn gluten meal to L-tryptophan to L-lysine is 420:46.5:5:1.

6. The composition as claimed in claim 1 further including potassium citrate.

7. The composition as claimed in claim 1 in which the ratio of protein calories to fat calories in said composition is greater than about 0.40:1.

8. The composition as claimed in claim 1 in which said composition further includes fermentable fibers selected from the group consisting of beet pulp, gum arabic, gum talha, psyllium, rice bran, carob bean gum, citrus pulp, pectin, fructooligosaccharides, mannanoligosaccharides, and mixtures thereof, which fermentable fibers have an organic matter disappearance of 15 to 60 percent when fermented by fecal bacteria for a 24 hour period, said fibers being present in amounts from about 1 to 11 weight percent of supplemental total dietary fiber.

9. A pet food composition comprising from about 10 to about 32% crude protein, from about 8 to about 20% fat, and from about 3 to about 25% total dietary fiber, said crude protein comprising soy protein isolate and corn gluten meal, and wherein said composition further includes fermentable fibers selected from the group consisting of beet pulp, gum arabic, gum talha, psyllium, rice bran, carob bean gum, citrus pulp, pectin, fructooligosaccharides, mannanoligosaccharides, and mixtures thereof, which fermentable fibers have an organic matter disappearance of 15 to 60 percent when fermented by fecal bacteria for a 24 hour period, said fibers being present in amounts from about 1 to 11 weight percent of supplemental total dietary fiber, all percentages by weight (dry matter basis).

10. A composition as claimed in claim 9 in which said composition further includes L-lysine and L-tryptophan.

11. A composition as claimed in claim 9 in which the protein content of said composition includes from about 5 to about 15% soy protein isolate and from about 0.5 to about 2.5% corn gluten meal, said composition further comprising from about 0.01 to about 0.22% L-lysine, and from about 0.01 to about 0.22% L-tryptophan.

12. A composition as claimed in claim 11 in which the weight ratio of soy protein isolate to corn gluten meal to L-tryptophan to L-lysine is 420:46.5:5:1.

13. A composition as claimed in claim 9 further including potassium citrate.

14. A composition as claimed in claim 9 in which the ratio of protein calories to fat calories in said composition is greater than about 0.40:1.

* * * * *